Dec. 11, 1923.  
T. FINLAYSON  
PORTABLE POWER CUT-OFF SAW  
Filed Feb. 25, 1920

Inventor:  
THOMAS FINLAYSON  
By  
HIS ATTORNEYS.

Dec. 11, 1923.  1,477,114
T. FINLAYSON
PORTABLE POWER CUT-OFF SAW
Filed Feb. 25, 1920   2 Sheets-Sheet 2

Inventor:
By  Thomas Finlayson
His Attorneys.

Patented Dec. 11, 1923.

1,477,114

UNITED STATES PATENT OFFICE.

THOMAS FINLAYSON, OF OAKLAND, CALIFORNIA.

PORTABLE POWER CUT-OFF SAW.

Application filed February 25, 1920. Serial No. 361,316.

*To all whom it may concern:*

Be it known that I, THOMAS FINLAYSON, a citizen of the United States, residing at Oakland, in the county of Alameda and State of California, have invented certain new and useful Improvements in Portable Power Cut-Off Saws; and I do hereby declare the following to be a full, clear, and exact description of the same, reference being had to the accompanying drawings, forming part of this specification.

This invention relates to saws of medium size for cutting up logs and beams or for felling standing timber of a size up to two feet in diameter, and has for its object the provision of a saw of this nature which will enable one man to accomplish with it the work of at least two men and in a slightly more expedient manner. The invention contemplates the provision of a readily adjustable saw driven by a high speed engine having a relatively short stroke, and has for its principal object the provision of means for simplifying and improving saws of this nature.

While there are a number of portable power saws on the market most of them are entirely too complicated for use or else are too cumbersome to be operated by one man so that where labor is at high price little can be gained by the use of such style power saws, because the time gained in sawing as against the time required when using a simple cross cut saw is more than lost by the time necessary to adjust the machinery. In the present case however, the saw and the clamp are separate pieces and the clamp can be adjusted to a nicety with great ease and insures the location of the kerf at the exact point desired, since the space between the line of the saw teeth and the edge of the clamp is a definitely fixed distance. One notable improvement of the present device over other saws is that in cutting a piece of wood lying flat on the earth it is possible to saw right down to the ground without blocking up the timber to be sawed.

Referring now to the drawings.

Figure 3:
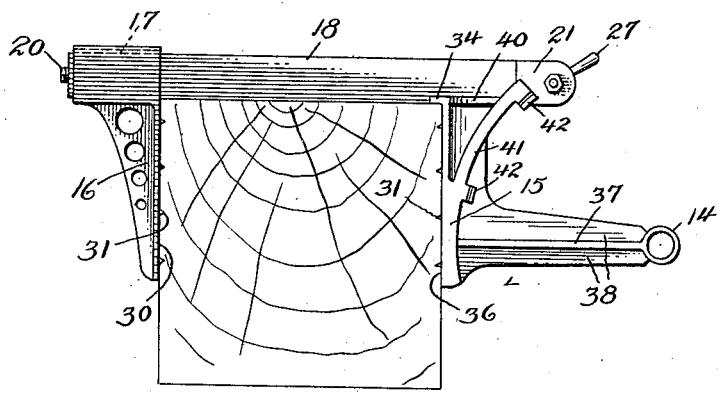
Fig. 3 is a side elevation of the clamp.
Figures 4, 5:
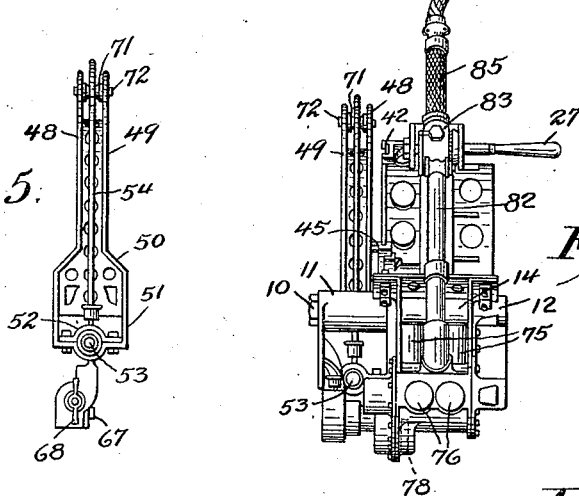
Fig. 4 is an end elevation of the complete device taken from the motor end.
Fig. 5 is an end elevation taken from the opposite or free end of the device.

The device in its preferred form as illustrated in the drawings consists of three principal parts—the clamp, the engine and the saw, these parts being readily assembled by means of an axle 10 which passes through a cylinder 11 at the end of the saw support, through a thimble bearing 12 integral with the engine frame, and also through a sleeve 14 integral with and forming one end of the clamp. Referring particularly to Figure 3, the clamp consists of but two parts or jaws, one a casting 15 and the other a foot 16, the latter provided with slots 17 to receive the guide rods 18 which are integral parts of the other jaw 15 which may be considered as the permanent jaw of the clamp, since the foot or movable jaw 16 is the adjustable part thereof, receiving its motion by virtue of a threaded engagement with the adjusting screw 20 journaled in a yoke 21 and having a bevel gear 22 meshing with a similar but larger gear 23 on the shaft 24, which latter is journaled in the arms 25 of the yoke 21 and is operated manually by means of a crank handle 27 thereby causing the foot-piece 16 to move toward or away from the stationary jaw 15 according to the direction of rotation of the shaft 24. The engaging face 30 of the movable jaw 16 is preferably provided with small prongs or spikes 31 to securely grasp the timber to be sawed and is of such length as to be most convenient for use with the type of material intended to be operated upon.

The casting 15 is provided at one end with a shelf 34 adapted to overlie one edge of a square piece of timber, as best shown in Figure 3, and at the other end carries the sleeve 14 which as has been stated is an extended cylinder forming the main support for the engine and the saw frame. The sleeve 14 is connected to the engaging face 36, which as shown in Fig. 3 is a vertical continuation of the horizontal shelf 34 by means of a plate 37 reinforced above and below with the usual stiffening ribs 38 which are preferably alined with the guide rods 18, although not necessarily so. The casting 15 also carries on the side nearest the saw support a laterally extended web 40 having at its end a flange guide 41 provided at two or more places with L-shaped lugs 42 for cooperating therewith to form a guideway for the arc 45 extending from one of the side pieces 48 of the saw support.

The saw support consists principally of the side pieces 48 and 49 which are in general of U-shaped formation and extend parallel to one another in their central portion, but are extended outwardly as at 50 at the front end and also diverge at that point to form a saddle 51 cooperating with a cap 52 to form a bearing for the guide rod 53 of the saw frame 54. At the rear end these side pieces 48 and 49 again diverge as at 56 for a similar purpose and are extended at a sharp angle to the leg of the U in a bracket-like formation, holding in place the cylinder 11 which surrounds the axle 10. At a central point the cylinder 11 has mounted in lugs thereon a small cog wheel 60 operated by a handle 61 for quickly projecting the axle 10 through the sleeve 14 and into the thimble bearing 12 when it is desired to lock the three principal parts of the device together. The bearing 62 for the rear guide rod 63 is bushed in the usual manner as is also the bearing for the front guide rod 53. The saw frame 54 is of the normal U-shaped formation and as has been previously mentioned carries the two guide rods 53 and 63, and below these rods is provided with the usual fixed fastening means 66 and the mating adjusting means 67, the latter being operated by the thumb nut 68 to tighten up the saw blade 69 which is made of a fine quality high speed steel in order to stand the heavy duty imposed upon it by the rapid work. The frame 54 is provided at its central portion with a slot 70 receiving therein a small wheel 71 mounted on an axle 72 supported in the side pieces 48 and 49 to partly carry the weight of the saw and partly to lessen the friction.

The motor may be of any desired type, but as illustrated, consists of a compressed air engine having four cylinders,—two of which 75 are arranged vertically and the other two 76 arranged horizontally thus providing a very compact arrangement of angle engine well adapted for this type of work. The power shaft 77 of the motor may be directly connected to the saw by means of the usual crank but for certain sizes of apparatus I preferably insert a gear 78 between such shaft and the eccentric 79 which is connected to the saw frame 54 by means of the pitman 80, the purpose of the gear 78 being to reduce the speed at which the saw is operated.

Figure 2:
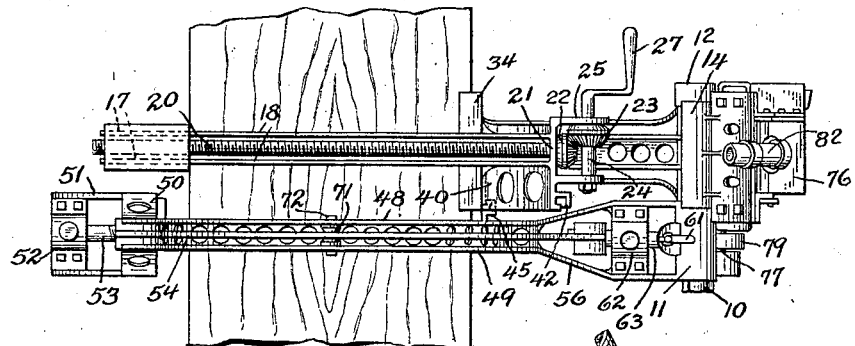
Fig. 2 is a plan view thereof.
Figure 1:
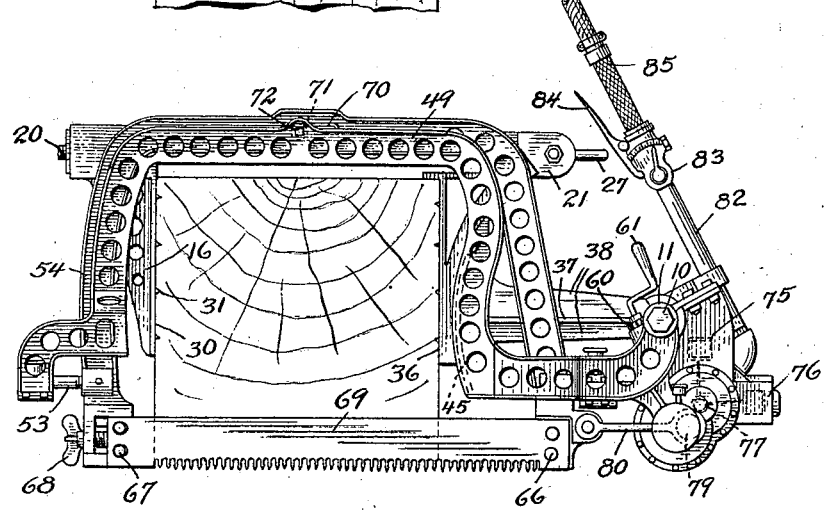
Fig. 1 is an elevation of my device at the end of the sawing operation.
Figure 6:
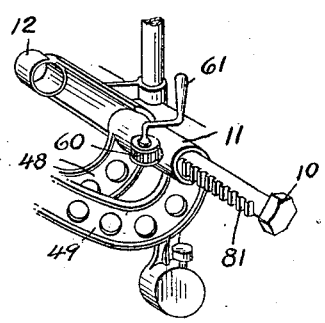
Fig. 6 is a perspective view of the bracket at the end of the saw support.

In order to operate the saw, the clamp is secured to the timber in the desired place by locating the face 36 of the casting 15 at such position that the desired kerf will be the same distance from the edge of the casting as the saw blade is from such edge when assembled, and when this position has been ascertained the clamp is fastened in place by turning the handle 27, thereby bringing the foot or movable jaw 16 of the clamp into position to maintain the parts in place. It has been found in practice unnecessary to provide any lock for the gears 22 and 23 but such locks are old and well known and may be applied if desired. When the clamp is thus secured the engine and saw support are so located with respect to each other that the arc 45 of the support will fit in the groove of the guide 41 which will hold the parts in position sufficiently long to insert the axle 10 through the sleeve 14 and into the thimble 12, such movement being accomplished by a couple of turns of the handle 61 operating the gear 60 meshing with the rack 81 shown in Figure 6. The device is now ready to start sawing and this is accomplished by turning the saw on the axle 10 by means of the handle 82 which is the admission pipe conveying compressed air to the engine and is provided as usual with the regulation lever valve 83 for controlling the pressure and also with the spring-pressed admission valve 84 in close proximity to the knurled handle portion 84 connected to the flexible hose 85. The saw starts its kerf at the corner of the block engaged by the shelf 34 and ends the stroke parallel to the face of such a block as shown in Figure 1.

What is claimed is:—

1. In a device of the character described, a clamp, a sleeve carried by said clamp, an axle in said sleeve, a saw support pivotally mounted on said axle, and means carried by said saw support for removing said axle from said sleeve.

2. In a device of the character described, a clamp consisting of a fixed jaw and a movable jaw adjustable with respect thereto, a bracket extending from said fixed jaw, a sleeve at the end of said bracket, an axle slidably mounted in said sleeve, a saw support, a plurality of spaced coaxial hollow cylinders carried by said saw support and adapted to slidably receive said axle, a saw carried by said saw support, means for reciprocating said saw, and means carried by one of said hollow cylinders for sliding said axle in and out of said sleeve.

3. In a device of the character described a clamp, a saw support pivotally mounted thereon, said saw support consisting of two spaced parallel U-shaped members, an anti-friction wheel centrally mounted between said members, a saw mounted between said members and supported in part by said anti-friction wheel, and means for reciprocating said saw.

4. In a device of the character described, a clamp consisting of a fixed and a movable jaw adjustable with relation thereto, a bracket extending from said fixed jaw, a sleeve on the end of said bracket, an axle in said sleeve, a saw support pivotally mounted on said axle, said support consisting of two approximately parallel U-shaped members, a friction wheel mounted between said members, a saw mounted between said members and having a bearing rod at either end slidable in bearings provided by said U-shaped members and guided centrally by said friction wheel, and means for reciprocating said saw.

5. In a device of the character described, an adjustable clamp, a saw support, a reciprocating saw, means for operating said saw, and a single means for assembling the saw support, clamp, and operating means to provide for pivotal movement of said saw, said support and said operating means.

6. In a saw support, a reciprocating saw, a plurality of U-shaped members substantially parallel throughout their central portion but extended outwardly from the U-portion and divergent at said point of departure to provide bearings for said saw, additional means for guiding the central portion of said saw, means for reciprocating said saw, and means for pivotally mounting said saw and support with respect to the material to be sawed.

7. In a device of the character described, an adjustable clamp, a saw support pivotally mounted on said clamp, co-operating means on said clamp and said support for guiding said saw support in its pivotal movement, and rack and pinion means carried by said support for quickly disconnecting said support from said clamp.

THOMAS FINLAYSON.